Figure 1:
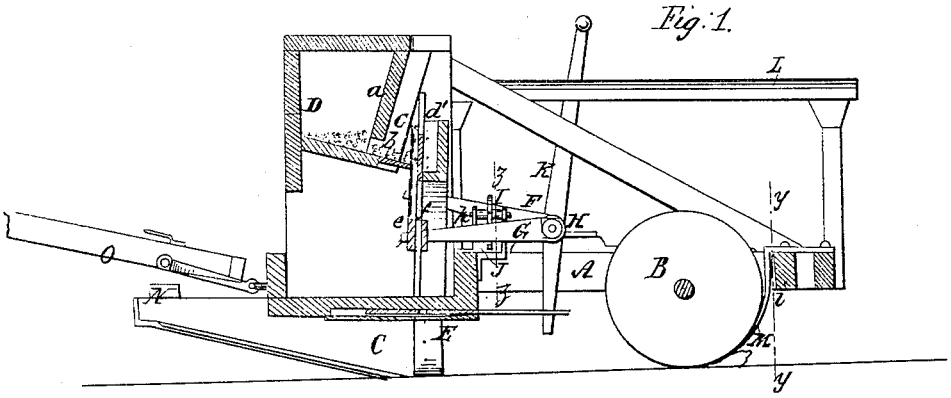
Figure 2:
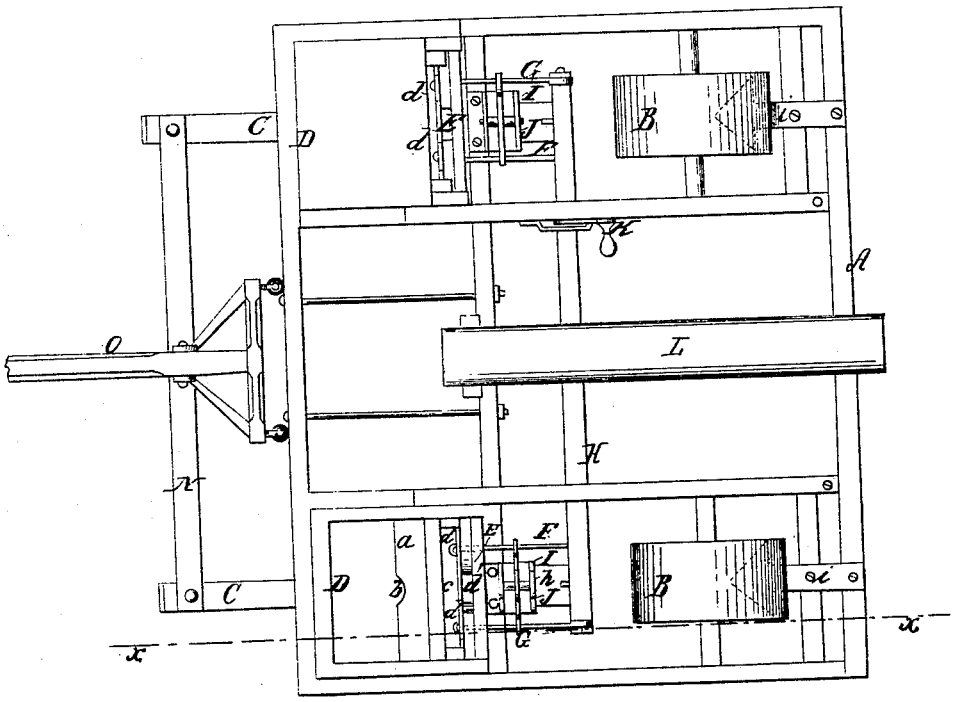
Figure 3:
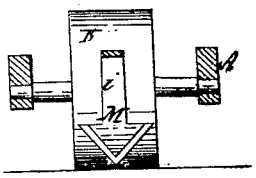
Figure 4:
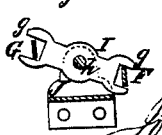

J. Huston.

Corn Planter.

No. 269. A. I. Patented Mar. 6, 1860.

Witnesses;
Lucius F. Langer.
W. F. Whitmore.

Inventor:
John Huston.

N. PETERS, PHOTO-LITHOGRAPHER, WASHINGTON, D. C.